US008489637B2

(12) United States Patent
Patil

(10) Patent No.: US 8,489,637 B2
(45) Date of Patent: Jul. 16, 2013

(54) USER-BASED DNS SERVER ACCESS CONTROL

(75) Inventor: Poornima Srinivas Patil, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/621,818

(22) Filed: Nov. 19, 2009

(65) Prior Publication Data

US 2011/0119306 A1    May 19, 2011

(51) Int. Cl.
G06F 17/30    (2006.01)
(52) U.S. Cl.
USPC ............................ 707/783; 707/784; 707/785
(58) Field of Classification Search
USPC ........................ 707/783–785; 709/245; 726/6
See application file for complete search history.

(56) References Cited

U.S. PATENT DOCUMENTS

| 6,256,671 | B1 | 7/2001 | Strentzsch et al. | |
| 6,961,783 | B1* | 11/2005 | Cook et al. | 709/245 |
| 7,299,491 | B2 | 11/2007 | Shelest et al. | |
| 7,502,923 | B2 | 3/2009 | Poyhonen et al. | |
| 7,562,148 | B2* | 7/2009 | Metke et al. | 709/228 |
| 7,747,780 | B2* | 6/2010 | Perry et al. | 709/245 |
| 7,792,994 | B1* | 9/2010 | Hernacki | 709/245 |
| 2004/0039906 | A1 | 2/2004 | Oka et al. | |
| 2004/0215707 | A1 | 10/2004 | Fujita et al. | |
| 2005/0044352 | A1* | 2/2005 | Pazi et al. | 713/153 |
| 2008/0028073 | A1 | 1/2008 | Trabe et al. | |
| 2009/0112814 | A1 | 4/2009 | Statia et al. | |
| 2009/0241167 | A1* | 9/2009 | Moore | 726/1 |
| 2010/0023611 | A1* | 1/2010 | Yang et al. | 709/223 |
| 2010/0095359 | A1* | 4/2010 | Gordon | 726/6 |
| 2011/0038483 | A1* | 2/2011 | Goeller et al. | 380/282 |
| 2011/0119306 | A1* | 5/2011 | Patil | 707/783 |

FOREIGN PATENT DOCUMENTS

| CN | 101087253 A | 12/2007 |
| CN | 101282368 A | 10/2008 |
| CN | 101390087 A | 3/2009 |
| CN | 101442566 A | 5/2009 |

OTHER PUBLICATIONS

Suzuki, Shinichi; Shinjo, Yasushi; Hirotsu, Toshio; Kato, Kazuhiko; Itano, Kozo; "Name-Level Approach for Egress Network Access Control," ICN 2005, 4th International Conference on Networking; Proceedings, Part II 2005; Apr. 17-21, 2005; 13 pages (pp. 284-296); Reunion Island, France.
SIPO Office Action dated Jan. 23, 2013 for co-pending Chinese counterpart patent app. No. 201010548582.9.

* cited by examiner

*Primary Examiner* — Debbie Le
(74) *Attorney, Agent, or Firm* — D'Ambrosio & Menon, PLLC

(57) ABSTRACT

Methods, systems, and computer program products for managing access to a Domain Name Service (DNS) database. Embodiments of the present disclosure enable authorization of DNS request messages, such as queries and update requests according to user and network address information. The authorization functionality may be incorporated into existing DNS systems. The invention includes a method including receiving a DNS request message originated from a client by a user, the DNS request message comprising a request and identification information specific to the user; determining if the client is authorized to access a DNS database in dependence upon client address information and the user specific identification information contained in the DNS request message; and executing the request in response to determining the user is authorized. The method may further include extracting user specific identification information from a portion of the ID field of DNS messages.

17 Claims, 6 Drawing Sheets

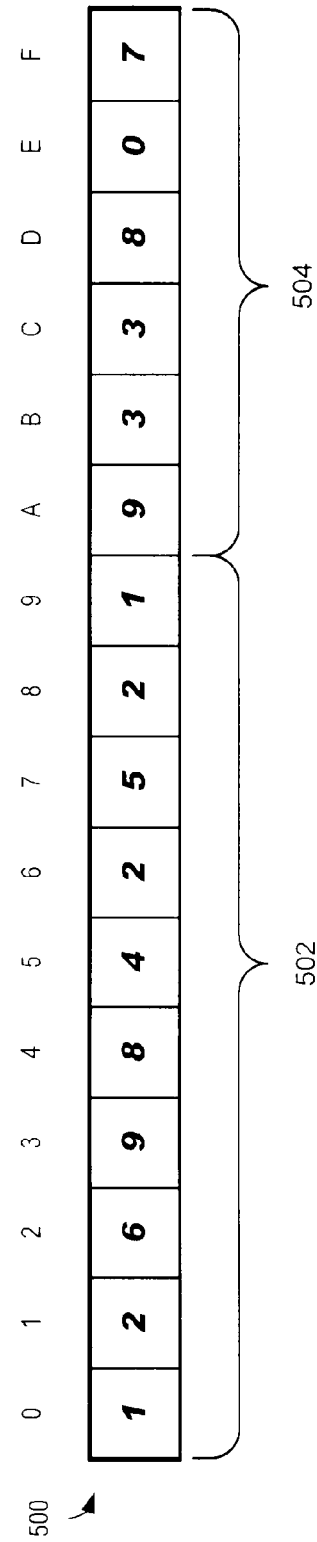

USER-BASED DNS SERVER ACCESS CONTROL

BACKGROUND

The domain name system is a hierarchical naming system for computers, services, or other resources connected to the Internet, or a private network. Networking devices are associated with an Internet protocol address ('IP address') a numerical identifier for the purpose of locating and addressing devices on a network. The domain name system associates domain names assigned to each of the participants with the IP address of the participants' devices.

The Domain Name Service ('DNS') resolves Uniform Resource Locators ('URLs') including domain names to their respective IP addresses to enable networked communication. DNS servers distributed over the Internet maintain a database that maps domain names to the associated IP addresses. A client computer uses a DNS resolver to locate its DNS server, then queries that DNS server to resolve a URL. If the DNS server is not authoritative for the destination domain, or if the DNS server does not have the information in its cache, it will not be able to answer the client query immediately. Instead, the DNS server acts as a DNS forwarder and/or issues a recursive query. A DNS forwarder will forward the query to another DNS server. If recursive querying is allowed, the DNS server asks a root name server for the IP address of a host that is authoritative for the destination domain, and then contacts the authoritative server and reports back to the client. Alternatively, the client may also receive a non-authoritative response from a DNS server if the server has found the answer in its cache.

SUMMARY

Methods, systems, and computer program products for managing access to a Domain Name Service (DNS) database. Embodiments of the present disclosure enable authorization of DNS request messages, such as queries and update requests according to user and network address information. The authorization functionality may be incorporated into existing DNS systems.

In a first general embodiment, the invention includes a method including receiving a DNS request message originated from a client by a user, the DNS request message comprising a request and unencrypted identification information specific to the user; determining if the client is authorized to access a DNS database in dependence upon client address information and the unencrypted user specific identification information contained in the DNS request message; and executing the request in response to determining the user is authorized. The method may further include extracting user specific identification information from a portion of the ID field of DNS messages.

Other general embodiments include a system for managing access to a Domain Name Service (DNS) database. The data processing systems comprise a processor and a computer memory operatively coupled to the processor. The computer memory of one or more of the systems have disposed within it computer program instructions for execution on the processor to implement one or more of the method embodiments described above.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4B illustrates a data structure in accordance with one embodiment of the invention.

FIG. 5 illustrates a data structure in accordance with one embodiment of the invention.

DETAILED DESCRIPTION

Figure 1A:
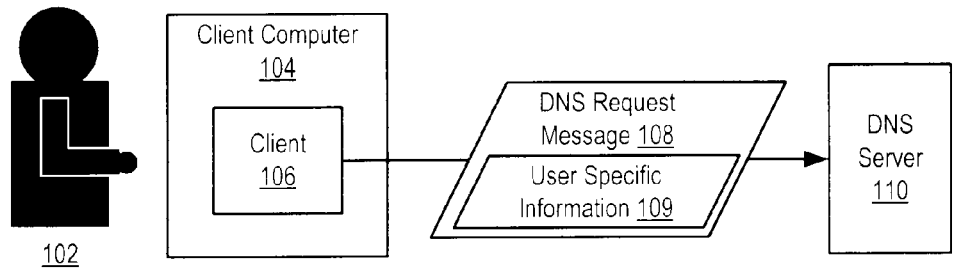
FIGS. 1A-C illustrates a use case in accordance with one or more embodiments of the invention.

Exemplary methods, systems, and design structures for managing access to a DNS database according to embodiments of the present invention are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, components, acts, and equivalents of all means or step plus function elements in the claims below are intended to include any structure, material or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware embodiments that may all generally be referred to herein as a "circuit," "module" or "system." Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages.

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The Domain Name Service ('DNS') facilitates communication of information between connected devices. This facilitation is accomplished through various operations, such as a client querying a DNS server, a DNS server replying to a query, a DNS server forwarding the query, dynamically updating DNS information on a DNS server, and so on. These operations are carried out by sending messages between devices that exchange information about names and objects on the Internet.

Figure 1B:
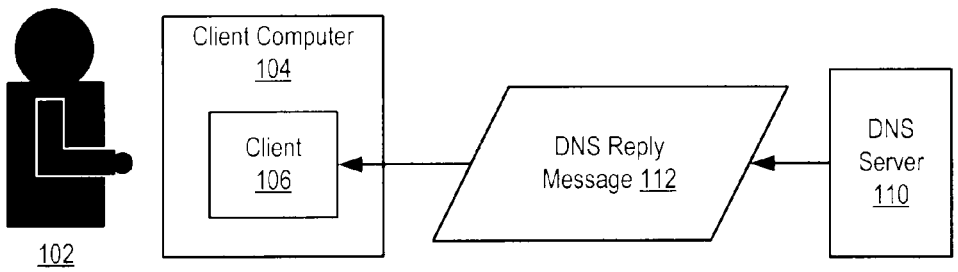
Figure 1C:
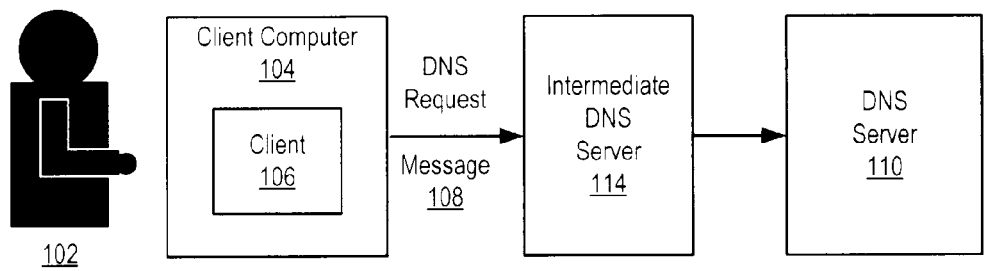

FIGS. 1A-C illustrate a use case in accordance with one embodiment of the invention. Referring to FIG. 1A, a user 102 works at a client computer 104. A client 106 operating on the client computer 104 creates a modified DNS request message 108 and sends the DNS request message 108 to DNS server 110 over the Internet. The client 106 may transmit the message by various protocols, such as, for example, the User Datagram Protocol ('UDP'), Transmission Control Protocol ('TCP'), or any other transmission protocol as will occur to those of skill in the art.

The client 106 may be a resolver, i.e., a set of software utilities responsible for initiating and sequencing the queries that ultimately lead to a full translation of a desired resource, such as, for example, resolution of a domain name into an IP address. The DNS request message 108 comprises a request to access the DNS database at a DNS server. DNS request message 108 may be in any form as will occur to those of skill in the art to carry out domain name system functionality. The request may be a query request, so that the DNS request message is a DNS query message. Alternatively, the request may be an update request, so that the DNS request message is a DNS update message.

The DNS request message has been modified to include unencrypted identification information specific to the user (user specific identification information 109) according to embodiments of the present disclosure, discussed below in greater detail. For example, the user-specific identification information could include a user identifier ('ID') (e.g., a user name, a user identification number, etc.), a privilege identifier (for example, identifying privileges for multilevel security), and so on.

Still referring to FIG. 1A, the DNS server 110 receives the modified DNS request message 108. The DNS server 110 determines whether the client is authorized to access the DNS database in dependence upon the user specific information 109 contained in the DNS request message 108, as well as the client address information. The client address information could include an Internet Protocol ('IP') address, a MAC address, and so on. For example, an IP address may be obtained from a transmitted packet according to methods well-known in the art.

Referring to FIG. 1B, if the DNS server determines the user is authorized, the DNS server executes the request. For example, if the DNS request message 108 is a DNS query message, DNS server 110 sends a DNS reply message 112 back to the client 106 with the answer to the query.

Figure 2A:
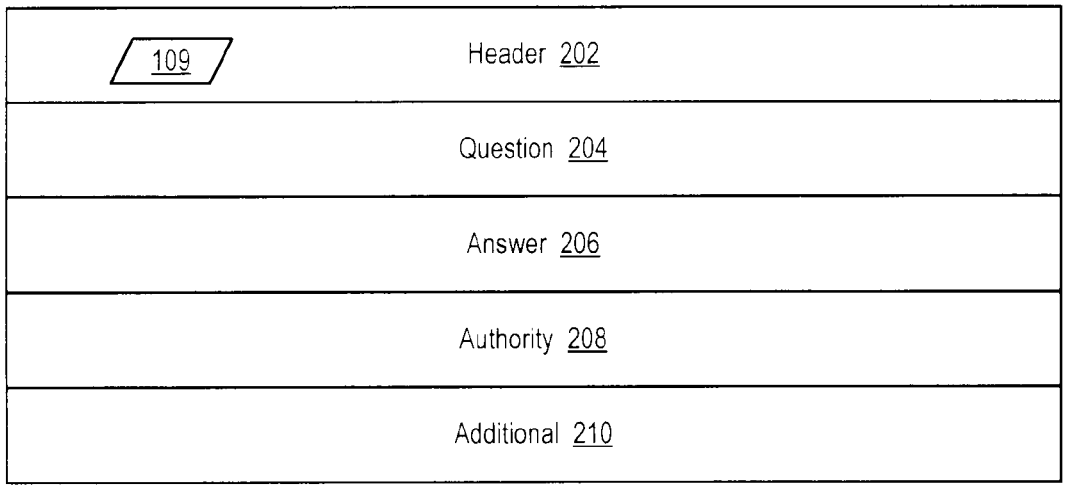
FIG. 2A-C illustrates message formats in accordance with one embodiment of the invention.

FIG. 2A illustrates a modified DNS query message 200 in accordance with one embodiment of the invention. The format of DNS query message 200 may be configured to comply with the standards defined in Request for Comments ('RFC') 1035. These standards specify that communications inside the domain protocol are carried in a single message format. The top-level format of the message is divided into sections, although some sections may be empty in particular DNS messages. The sections include the header 202, the question section 204, the answer section 206, the authority section 208, and the additional section 210. In the modified DNS message, user specific information 109 is carried in one of sections 202-210, while still retaining DNS functionality. In the DNS query message 200, of FIG. 2A, user specific information 109 is carried in header section 202, although user specific information 109 may be carried in other sections 204-210 in other implementations.

Figure 2B:
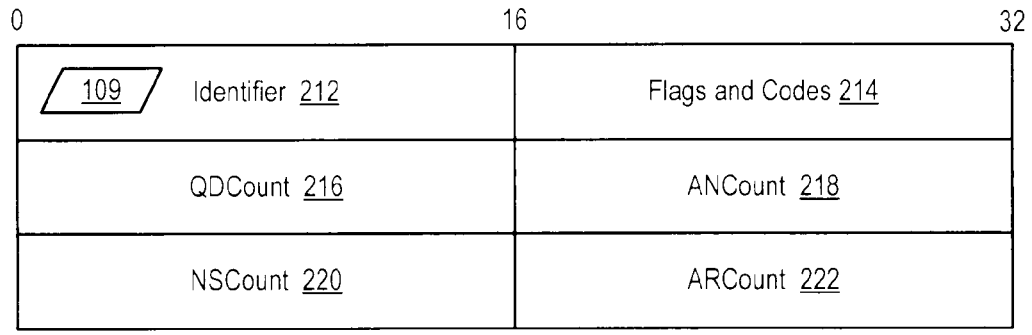
Figure 2C:
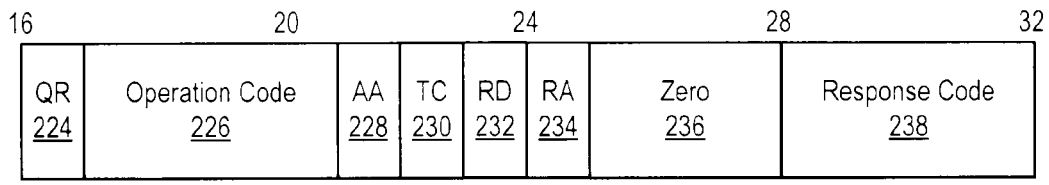

Referring to FIG. 2B, the header 202 includes fields that specify which of the remaining sections are present, and also specifies whether the message is a query, a response, or some other operation. The header 202 is not empty and is fixed in length. The header 202 contains fields that describe the type of DNS message and provide information about it, and fields that indicate the number of entries in the other sections of the message. The identifier ('ID') field 212 is a 16-bit identification field generated by the client 106 when creating the DNS request message 108. The DNS server 110 includes the contents of the ID field 212 in the ID field 212 of the response message 112. so it can be used by the client 106 to match the query to the corresponding reply. ID field 212 contains user specific information 109.

A group of flags and codes 214 follow the header 212. Referring to FIG. 2B, the QR flag field 224 indicates whether a message is a query or a response. The operation code ('opcode') field 226 is a four-bit field that specifies the type of query in the DNR message. The values are 0 for a standard query ('QUERY'), 1 for an inverse query ('IQUERY'). and 2 for a server status request ('STATUS'). The authoritative answer bit ('AA') 228 is valid in responses, and designates the responding name server as an authority for the domain name in the question section 204. The truncation field ('TC') 230 specifies that the message was truncated due to length greater than permitted. The recursion desired bit ('RD') 232 may be set, directing the DNS server 110 to pursue the query recursively. It is copied into the response message 112. The recursion available bit ('RA') 234 is set or cleared in a response, and denotes whether recursive query support is available in the DNS server 110. The zero field 236 is reserved for future use, and must be zero in all queries and responses. The response code field 238 is a 4-bit field set as part of responses.

The QDCount field 216 contains an unsigned 16-bit integer specifying the number of entries in the question section. The ANCount 218 field contains an unsigned 16-bit integer specifying the number of resource records in the answer section. The NSCount field 220 contains an unsigned 16-bit integer specifying the number of name server resource records in the authority records section. The ARCount field 222 contains an unsigned 16-bit integer specifying the number of resource records in the additional records section. In some embodiments, count fields 216-222 may carry user specific information.

Returning to FIG. 2A, the question section 204 includes one or more "questions," that is, the parameters that define queries for information being sent to a DNS server 110. The answer section 206, authority section 208, and additional section 210 share a common format. They contain a variable number of resource records. The answer section 206 includes one or more resource records that answer the question(s) indicated in the question section. The authority section 208 includes one or more authority records. Authority records are resource records that identify authoritative name servers that can be used to continue the resolution process when the receiving server doesn't have the information the client requested. Thus, authority records link servers hierarchically. The additional section 210 contains one or more resource records that contain additional information related to the query that is not strictly necessary to answer the questions in the message. The additional section 210 may be used to improve DNS efficiency by supplying answers to predicted subsequent questions.

Returning to FIG. 1A, the client 106 initiates a query by creating a message 108 with appropriate header information, and one or more queries (requests for information) in the question section 204. The QR flag 224 is set to 0 to indicate that the message 108 is a query message. The client 106 indicates the number of questions in the question section 204 by the number in the QDCount field 216. The number of entries in the others sections may be zero; thus, the count fields for the sections ANCount 218, NSCount 220, and ARCount 222 are set to 0.

Returning to FIG. 1B, if the user 102 is authorized, executing a query request may be carried out by processing the query and performing the information retrieval operation requested, if possible. The DNS server 110 uses the DNS request message 108 as the basis for the DNS reply message 112. The header section 202 and question section 204 are copied to the DNS reply message 112, and the QR flag 224 is set to 1 to indicate that the message is a reply. Particular fields in the header 202 are also modified to provide information to the client. For example, the server sets the Response Code field 238 to indicate whether the query was successful or if an error occurred, and if one did occur, to indicate the error. The DNS server 110 also includes DNS resource records in the answer section 206, authority section 208, and additional section 210 of the DNS reply message as appropriate. Each section may include zero or more records. Meaning is derived according to the section where a record is carried. For example, a resource record included in the answer section 206 is understood to be an answer to the query.

The DNS operates by periodically updating DNS information on master files on the primary server for a zone. The zone is then copied in its entirety to slave servers. Using a particular message syntax, DNS update messages allow for adding, deleting, or modifying resource records within the master name server for a zone.

The DNS request message 108 may be an update message in some embodiments of the invention. The format of a DNS update message may be configured to comply with the standards defined in RFC 2136. entitled "Dynamic Updates in the Domain Name System (DNS UPDATE)." These standards specify an enhancement to basic DNS operation that allows DNS information to be dynamically updated, including the formats of DNS update messages. RFC 2136 defines the DNS update message as a DNS message type. This standard defines the format for the syntax and headers that make up DNS update messages. The DNS update message is designed with an identical structure to other DNS messages. but the meanings of several of the fields have been redefined.

For example, the question section 204 corresponds to the zone section used to denote the zone of the records being updated. The answer section 206 corresponds to the prerequisite section containing a set of resource record set prerequisites that must be satisfied at the time the UPDATE packet is received by the primary master server. The authority section 208 corresponds to the update section, which contains resource records to be added to or deleted from the zone. The additional section 210 contains resource records that are related to the update itself, or to new resource records being added by the update. Other codes are modified as well. For example, the Operation Code field 226 for an update message is set to 5 to indicate the message is an update message.

Referring to FIG. 1C, the DNS request message 108 may not be transmitted directly to DNS server 110. Instead, DNS request message 108 may be transmitted to one or more intermediate DNS servers 114, from which the DNS request message 108 is forwarded to DNS server 110. Client 106, as presented in the context of the present application, should not be confused with the use of the term "client" frequently used in the context of client/server computing. Although in a particular instance, the intermediate DNS server 114 may act as a client, i.e., initiating the communication by sending a query, in the context of the present disclosure, the intermediate server 114 is not referred to as a client.

Embodiments of the present disclosure include computer-implemented methods described below. In some embodiments, these methods may be carried out entirely on one apparatus or computer of the system. Alternatively, portions of the methods may be carried out on two or more computers connected by a network, such as one or more local area networks ('LANs'), wide area networks ('WANs'), wired or cellular telephone networks, intranets, or the Internet. The order of method elements as described herein does not necessarily limit the order in which the elements can be performed.

Client computers such as desktops, workstations, smartphones connected to the internet through wireless communication, laptop computers, shared computing systems, or any other computing device designed for networked computing may be connected through a network to DNS server computers running a DNS server application. Each of the client computers may include client software running on them to format DNS messages and use the Internet Protocol Suite ('TCP/IP') or other communication protocols to send modified DNS messages according to the present invention to DNS server computers.

Networks may include, alone or in combination, one or more local area networks ('LANs'), wide area networks ('WANs'), wired or cellular telephone networks, intranets, or the Internet. Embodiments of the present invention include computer implemented methods operating on any of the client computers and DNS servers according to embodiments of the present disclosure. Embodiments of the present disclosure may include any or all of these devices.

These devices are provided for illustration and not for limitation. Embodiments of the invention could be implemented as any viable computing device including logic and memory, or software modules including computer program instructions executed thereon, as will occur to one of ordinary skill in the art, including devices where logic is implemented as field-programmable gate arrays ('FPGAs'), application-specific integrated circuits ('ASICs'), and the like.

Figure 3:
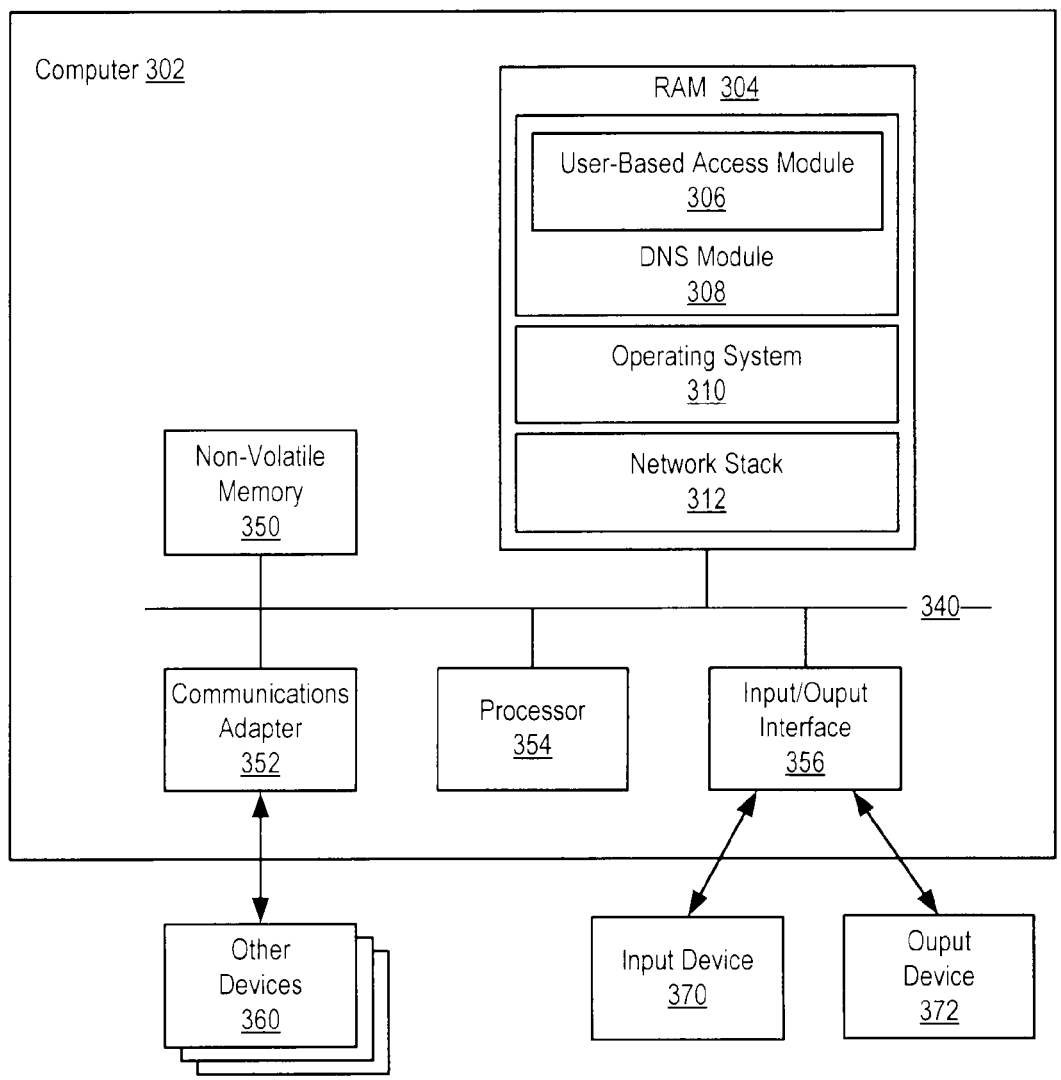
FIG. 3 illustrates a block diagram of a computer in accordance with one or more embodiments of the invention.

Embodiments of the presently disclosed invention are implemented to some extent as software modules installed and running on one or more data processing systems ('computers'), such as servers, workstations, tablet computers, PCs, personal digital assistants ('PDAs'), smart phones, and so on. FIG. 3 sets forth a block diagram of an exemplary computer used in embodiments of the present disclosure. Computer 302 includes at least one computer processor 354 as well as a computer memory, including both volatile random access memory ('RAM') 304 and some form or forms of non-volatile computer memory 350 such as a hard disk drive, an optical disk drive, or an electrically erasable programmable read-only memory space (also known as 'EEPROM' or 'Flash' memory). The computer memory is connected through a system bus 340 to the processor 354 and to other system components. Thus, the software modules are program instructions stored in computer memory.

An operating system 310 is stored in computer memory. Operating system 310 may be any appropriate operating system such as Windows XP, Windows Vista, Windows Server, Mac OS X, UNIX, LINUX, Solaris, or AIX from International Business Machines Corporation (Armonk, N.Y.). A network stack 312 is also stored in memory. The network stack 312 is a software implementation of cooperating computer networking protocols to facilitate network communications.

Computer 302 also includes one or more input/output interface adapters 356. Input/output interface adapters 356 may implement user-oriented input/output through software drivers and computer hardware for controlling output to output devices 372 such as computer display screens, as well as user input from input devices 370, such as keyboards and mice.

Computer 302 also includes a communications adapter 352 for implementing data communications with other devices 360. Communications adapter 352 implements the hardware level of data communications through which one computer sends data communications to another computer through a network.

Also stored in computer memory is a DNS module 308. The DNS module 308 may include device-specific computer program instructions for implementing DNS. DNS module 308 may be implemented, in part, as a resolver operating in a web browser (or other client application) running on a desktop or workstation operated or initiated by a user. DNS module 308 may also be implemented, in part, as one or more server applications running on a DNS server. The DNS module 308 comprises a user-based access module 306. The DNS module 308 and user-based access module 306 functionality is different between client and server devices. The user-based access module 306 on clients operates to form requests including user-specific information 109, as described above with reference to FIGS. 1A-C and 2A-B. The user-based access module 306 on servers operates to authorize users and conditionally respond to requests as described above with reference to FIGS. 1A-C and 2A-B.

DNS module 308 may be implemented as one or more sub-modules operating in separate software layers or in the same layer. Although depicted as a separate module from operating system 310, the DNS module 308 or one or more of the sub-modules may be incorporated as part of the operating system 310, or a collaborative services architecture or other applications in memory. In various embodiments, the DNS module 308 may be implemented in the software stack or in firmware.

Figure 4A:
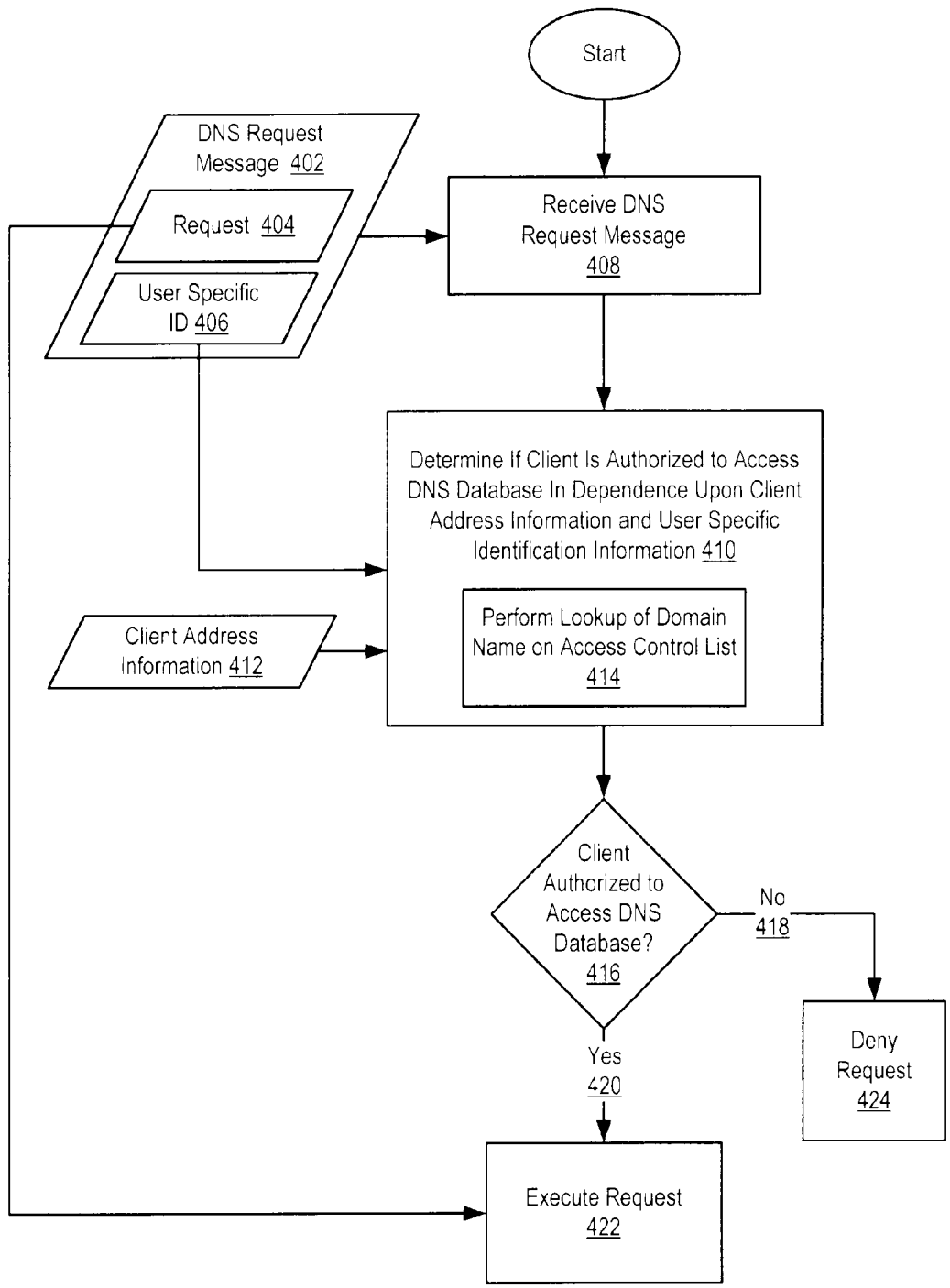
FIG. 4A illustrates a data flow diagram in accordance with one embodiment of a method for managing access to a Domain Name Service (DNS) database.

For further explanation, FIG. 4A sets forth a data flow diagram illustrating a method for managing access to a DNS database in accordance with one embodiment of the invention. To begin, a DNS server receives a DNS request message 402 (block 408). The DNS request message 402 may be originated from a client by a user. The DNS request message 402 includes a request 404 and identification information specific to the user 406.

The DNS server determines whether the client is authorized to access a DNS database (block 410). Determining whether the client is authorized may be carried out in dependence upon client address information 412 and the user specific identification information 406 contained in the DNS request message 402. Client address information 412 may include the client's IP address, geographic information, and so on. Determining whether the client is authorized may include performing a lookup of the domain name on an access control list (block 414). An access control list ('ACL') is a data structure (such as a list, matrix, table, etc.) of permissions attached to an object. An ACL specifies which users or system processes are granted access to objects. Initial configuration of the DNS server includes storing the IP address of the client along with the user information of the user in the access control list ('ACL').

FIG. 4B illustrates an access control list for a DNS resource record in accordance with embodiments of the invention. The access control list 450 comprises a table listing domain names 452. The table associates domain names 452 with combinations of IP address 454 and user identification number 456 that are allowed access to the DNS resource record. Separate DNS resource records may be maintained and used for different request messages, such as, for example, DNS query requests, DNS update requests, and so on. For example, access control list 450 includes domain names example.com, IBM.com, and xyz.gov. The domain name example.com may be accessed by users with the IP address 192.112.36.4 and the user identification number 2794425205 or 1269842521. Access control list 450 may be implemented in various configurations as will occur to those of skill in the art.

Returning to FIG. 4A, the DNS server will only act on the request in response to determining the user is authorized (decision 416). If the user is authorized (420), the DNS server executes the request (block 422). If the user fails to be authorized (418), the DNS server denies the request (block 424). Denying the request may include ignoring the request, notifying the client that the request has been denied, or taking additional security measures. For example, a running tabulation of the number of denied requests from a specific user or received from a particular address location may be kept.

Determining whether the user is authorized to access a DNS database in dependence upon the client address information and the user specific identification information (block 410) may also include extracting the user specific identification information from the DNS request message. In some embodiments, the user specific identification information (e.g., user identification number) may be inserted into a portion of a header 202 of the DNS request message 108, so that the portion of a header 202 may include the user specific identification information. In these embodiments, determining whether the user is authorized to access a DNS database in dependence upon the client address information and the user specific identification information (block 410) may be carried out by extracting the user specific identification information from that portion of the header.

FIG. 5 illustrates an ID field of the DNS request message header in accordance with embodiments of the present invention. Referring to FIG. 5, a portion of the ID field of the header of the DNS request message comprises the user specific identification information. The ID field 500 includes a unique identifier for the specific query 504 ('unique message identifier 504'), e.g., a randomly generated number. The ID field 500 also includes user specific identification information 502, e.g., a numerical user ID.

The number of bits used for specifying the user specific identification information may depend upon the number of users querying the DNS server simultaneously and the number of queries being sent to the server by each user simultaneously. Unique identifiers may be reused once the client receives a response to the query from the server. The optimal number of bits allocated for the numerical user ID and the unique identifier may vary on usage patterns of the implemented system.

For example, in the embodiment of FIG. 5, the numerical user ID 502 comprises the first ten bits of the ID field 500, and the unique identifier 504 for the query comprises the last 6 bits of the ID field 500. By using 10 bits from the ID field for the user-id and 6 bits for the unique identifier for the query from the user, $2^{10}$ (or 1024) users may have $2^6$ (or 64) outstanding queries. The ID field need only be unique to each client. Considering the above solution, each client can have 1024 users, with each user having 64 outstanding queries. In other embodiments, user specific identification information 502 may comprise more or fewer digits or may be incorporated in ID field 500 in other configurations, e.g., a specific set of arbitrary bit positions.

The overhead in bandwidth and processing power required to implement user-based authorization of access to DNS records according to the present disclosure is very low. DNS servers that have not been configured to extract the user specific identification information 502 from ID field 500 will treat the contents of the ID field 500 as a unique identifier and copy the contents of the ID field 500 in the reply message 112.

Thus, in some embodiments, determining whether the user is authorized to access a DNS database in dependence upon the client address information and the user specific identification information (block 410) may be carried out by extracting the user specific identification information from the portion of the ID field 500.

The client 106 adds unencrypted user specific identification information 109 to the DNS request message 108 according to embodiments of the invention. The DNS request message 108 may comprise a DNS message section including unencrypted identification information specific to the user ('user specific identification information 109').

Figure 6:
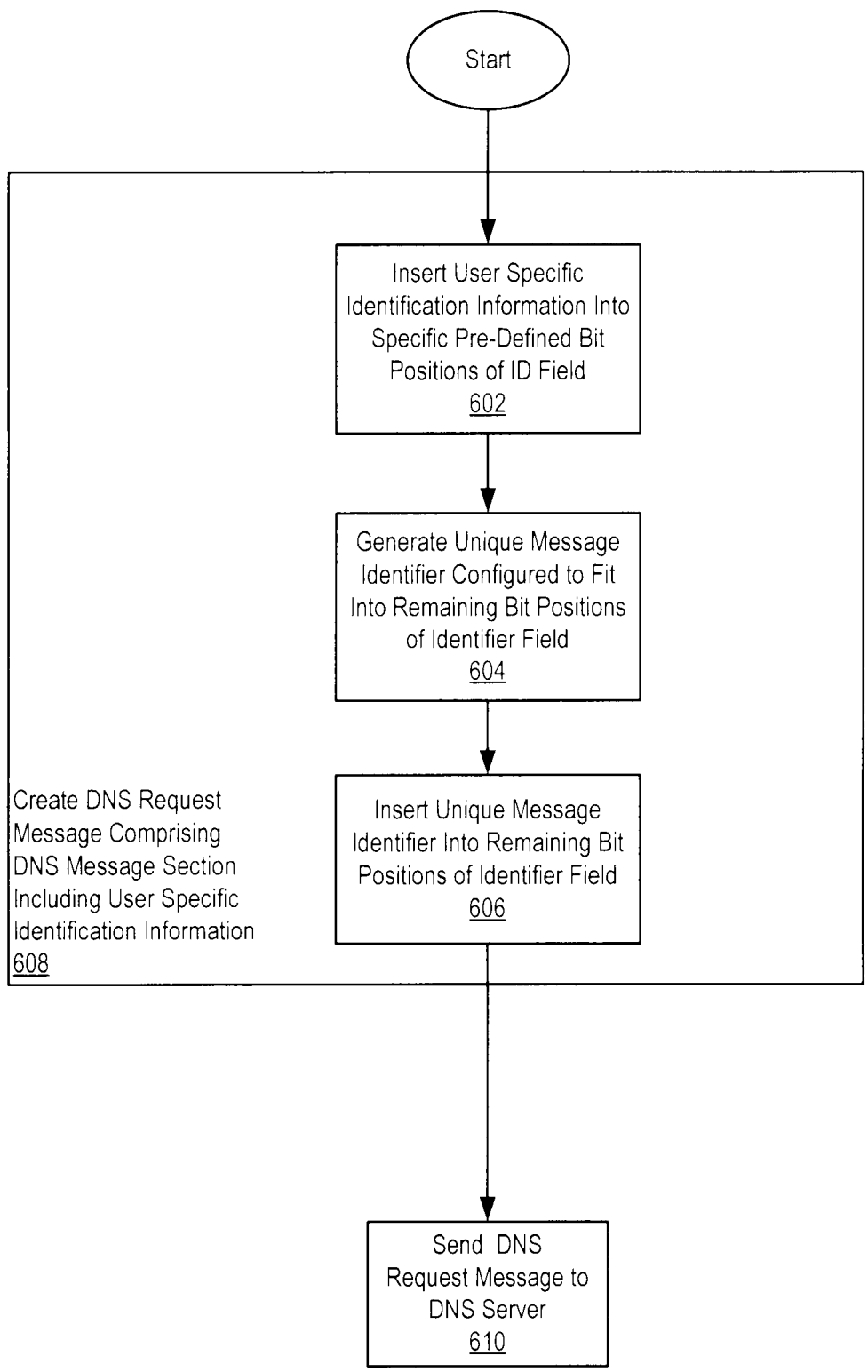
FIG. 6 illustrates a flow diagram in accordance with one embodiment of the invention for identifying a user in a DNS request message.

FIG. 6 sets forth a flow chart illustrating methods for identifying a user in a DNS request message 108 comprising creating a DNS request message 108 comprising a DNS message section including user specific identification information 109 (block 608); and sending the DNS request message 108 to the DNS server 110 (block 610). Creating the DNS request message 108 (block 608) may include inserting the user specific identification information 502 into specific pre-defined bit positions (e.g., 0-9) of the identifier (ID) field 500 of a header section 202 of the DNS message 108 (block 602); generating a unique message identifier 504 configured to fit into the remaining bit positions (e.g., e.g., bits A-F) of the identifier (ID) field 500 that lack the user specific identification information (block 604); and inserting the unique message identifier into the remaining bit positions of the identifier (ID) field (block 606). Note that generating a unique message identifier for bits that lack the user specific identification information (block 504) and inserting the unique message identifier into the remaining bit positions of the identifier (ID) field (block 506) may be carried out before inserting the user specific identification information into specific pre-defined bit positions of the identifier (ID) field 500 of a header section 202 of the DNS message 108 (block 502). In various embodiments, client 106 may employ diverse numerical, algebraic, and combinatorial logic techniques for combining user specific identification information 502 and unique message identifier 504. For example, the client 106 may generate the user specific identification information 502 and unique message identifier 504 separately and concatenate the user specific identification information 502 and unique message identifier 504 using hardware circuits specifically designed for such a purpose, or by software techniques known in the art. The client 106 may also generate user specific identification information 502 and unique message identifier 504 simultaneously.

It should be understood that the inventive concepts disclosed herein are capable of many modifications. Such modifications may include combinations of hardware and software embodiments, different data structures containing user specific information, changes to software architectures, the use of various functions and processes to retrieve stored information and determine client authorization, and so on. To the extent such modifications fall within the scope of the appended claims and their equivalents, they are intended to be covered by this patent.

What is claimed is:

1. A computer-implemented method for managing access to a Domain Name Service (DNS) database, the method comprising:
receiving a DNS request message originated from client software by a user operating a client computer, the client software comprising one or more software utilities running on the client computer, the DNS request message comprising a request and unencrypted identification information specific to the user;
determining if the user is authorized to access the DNS database in dependence upon client address information and the user specific identification information contained in the DNS request message, the determining if the user is authorized to access the DNS database further comprising performing a lookup of the domain name on an access control list, the access control list comprising a listing associating a plurality of domain names with at least one client address and user specific identification information pairing, each pairing representing a combination of a client address information and user specific identification information that is allowed to access to the associated domain name; and
executing the request in response to determining the user is authorized,
the user specific identification information comprises at least one of a user identifier and a privilege identifier.

2. The method of claim 1 wherein a portion of a header of the DNS request message comprises the user specific identification information, and determining if the user is authorized to access the DNS database in dependence upon the client address information and the user specific identification information comprises extracting the user specific identification information from the portion of the header.

3. The method of claim 2 wherein a portion of an identifier (ID) field of the header of the DNS request message comprises the user specific identification information, and determining if the user is authorized to access the DNS database in dependence upon the client address information and the user specific identification information comprises extracting the user specific identification information from the portion of the ID field.

4. The method of claim 1 wherein the request is an update request or a query.

5. The method of claim 3, wherein the identifier (ID) field of the header of the DNS request message comprises a predetermined number of bits comprising a first number of consecutive bits storing an identifier that corresponds to the user specific identification information and that uniquely identifies the user, and a second number of consecutive bits storing a message identifier that uniquely identifies the DNS request message, the first number of bits and the second number of bits together equaling the predetermined number of bits.

6. A computer program product for managing access to a Domain Name Service (DNS) database, the computer program product comprising:
non-transitory a computer readable storage medium having computer readable program code embodied therewith, the computer usable program code comprising:
computer readable program code configured to receive a DNS request message originated from client software by a user operating a client computer, the client software comprising one or more software utilities running on the client computer, the DNS request message comprising a request and identification information specific to the user;
computer readable program code configured to determine if the user is authorized to access a DNS database in dependence upon client address information and the user specific identification information contained in the DNS request message, the computer readable program code configured to determine if the user is authorized to access the DNS database further comprising computer readable program code configured to perform a lookup of the domain name on an access control list, the access control list comprising a listing associating a plurality of domain names with at least one client address and user specific identification information pairing, each pairing representing a combination of a client address information and user specific identification information that is allowed access to the associated domain name; and
computer readable program code configured to execute the request in response to determining the user is authorized, the user specific identification information comprises at least one of a user identifier and a privilege identifier.

7. The computer program product of claim 6 wherein a portion of a header of the DNS request message comprises the user specific identification information, and computer readable program code configured to determine if the user is authorized to access the DNS database in dependence upon the client address information and the user specific identification information comprises computer readable program code configured to extract the user specific identification information from the portion of the header.

8. The computer program product of claim 7 wherein a portion of an identifier (ID) field of the header of the DNS request message comprises the user specific identification information, and computer readable program code configured to determine if the user is authorized to access the DNS database in dependence upon the client address information and the user specific identification information comprises computer readable program code configured to extract the user specific identification information from the portion of the ID field.

9. The computer program product of claim 6 wherein the request is an update request or a query.

10. The computer program product of claim 8, wherein the identifier (ID) field of the header of the DNS request message comprises a predetermined number of bits comprising a first number of consecutive bits storing an identifier that corresponds to the user specific identification information and that uniquely identifies the user, and a second number of consecutive bits storing a message identifier that uniquely identifies the DNS request message, the first number of bits and the second number of bits together equaling the predetermined number of bits.

11. A system for managing access to a Domain Name Service (DNS) database, the system comprising:
a processor; and
a computer memory operatively coupled to the processor, the computer memory having disposed within it:
computer readable program code configured to receive a DNS request message originated from client software by a user operating a client computer, the client software comprising one or more software utilities running on the client computer, the DNS request message comprising a request and identification information specific to the user;

computer readable program code configured to determine if the user is authorized to access a DNS database in dependence upon client address information and the user specific identification information contained in the DNS request message, the computer readable program code configured to determine if the user is authorized to access the DNS database further comprising computer readable program code configured to perform a lookup of the domain name on an access control list, the access control list comprising a listing associating a plurality of domain names with at least one client address and user specific identification information pairing, each pairing representing a combination of a client address information and user specific identification information that is allowed access to the associated domain name; and computer readable program code configured to execute the request in response to determining the user is authorized, the user specific identification information comprises at least one of a user identifier and a privilege identifier.

12. The system of claim 11 wherein a portion of a header of the DNS request message comprises the user specific identification information, and computer readable program code configured to determine if the user is authorized to access the DNS database in dependence upon the client address information and the user specific identification information comprises computer readable program code configured to extract the user specific identification information from the portion of the header.

13. The system of claim 12 wherein a portion of an identifier (ID) field of the header of the DNS request message comprises the user specific identification information, and computer readable program code configured to determine if the user is authorized to access the DNS database in dependence upon the client address information and the user specific identification information comprises computer readable program code configured to extract the user specific identification information from the portion of the ID field.

14. The system of claim 13, wherein the identifier (ID) field of the header of the DNS request message comprises a predetermined number of bits comprising a first number of consecutive bits storing an identifier that corresponds to the user specific identification information and that uniquely identifies the user, and a second number of consecutive bits storing a message identifier that uniquely identifies the DNS request message, the first number of bits and the second number of bits together equaling the predetermined number of bits.

15. A computer-implemented method for identifying a user in a Domain Name Service (DNS) request message, the method comprising:

creating a DNS request message originated from client software by a user operating a client computer, the client software comprising one or more software utilities running on the client computer, the DNS request message comprising a DNS message section comprising unencrypted identification information specific to the user;

determining if the user is authorized to access a DNS database comprising performing a lookup of the domain name on an access control list, the access control list comprising a listing associating a plurality of domain names with at least one of a client address and a user specific identification information pairing, each pairing representing a combination of a client address information and user specific identification information that is allowed access to the associated domain name; and sending the DNS request message to a DNS server, the user specific identification information comprises at least one of a user identifier and a privilege identifier.

16. The method of claim 15 wherein creating the DNS request message originated from the client software by the user operating the client computer comprises:

inserting the user specific identification information into specific pre-defined bit positions of an identifier (ID) field of a header section of the DNS message;

generating a unique message identifier configured to fit into remaining bit positions of the identifier (ID) field that lack the user specific identification information; and inserting the unique message identifier into the remaining bit positions of the identifier (ID) field.

17. A computer program product for identifying a user in a Domain Name Service (DNS) request message, the computer program product comprising:

non-transitory a computer readable storage medium having computer readable program code embodied therewith, the computer usable program code comprising:

computer readable program code configured to create a DNS request message originated from client software by a user operating a client computer, the client software comprising one or more software utilities running on the client computer, the DNS request message comprising a DNS message section comprising unencrypted identification information specific to the user;

computer readable program code for determining if the user is authorized to access a DNS database comprising performing a lookup of the domain name on an access control list, the access control list comprising a listing associating a plurality of domain names with at least one of a client address and a user specific identification information pairing, each pairing representing a combination of a client address information and user specific identification information that is allowed access to the associated domain name, and computer readable program code configured to send the DNS request message to a DNS server, the user specific identification information comprises at least one of a user identifier and a privilege identifier.

* * * * *